US008255264B2

(12) United States Patent
Bowen et al.

(10) Patent No.: US 8,255,264 B2
(45) Date of Patent: Aug. 28, 2012

(54) METHODS AND SYSTEMS FOR DETERMINING THE EFFECTIVENESS OF A DEALER'S ABILITY TO CLOSE A SALE

(75) Inventors: John Bowen, Troy, MI (US); Frank Sauberlich, Weinheim (DE)

(73) Assignee: Urban Science Application, Inc., Detroit, MI (US)

( * ) Notice: Subject to any disclaimer, the term of this patent is extended or adjusted under 35 U.S.C. 154(b) by 1133 days.

(21) Appl. No.: 12/125,186

(22) Filed: May 22, 2008

(65) Prior Publication Data

US 2008/0306812 A1 Dec. 11, 2008

Related U.S. Application Data

(60) Provisional application No. 60/943,189, filed on Jun. 11, 2007.

(51) Int. Cl.
G06Q 10/00 (2012.01)
(52) U.S. Cl. ...................................... 705/7.29; 705/7.31
(58) Field of Classification Search ............... 705/7.29, 705/31
See application file for complete search history.

(56) References Cited

U.S. PATENT DOCUMENTS

| 6,941,305 | B2 | 9/2005 | Magouirk et al. |
| 7,305,364 | B2* | 12/2007 | Nabe et al. ................ 705/37 |
| 7,752,236 | B2* | 7/2010 | Williams et al. .............. 707/804 |
| 7,778,885 | B1* | 8/2010 | Semprevivo et al. ........ 705/26.1 |
| 7,945,473 | B2* | 5/2011 | Fano et al. ................... 705/14.1 |
| 2003/0033237 | A1* | 2/2003 | Bawri ............................. 705/37 |
| 2007/0233561 | A1* | 10/2007 | Golec ............................. 705/14 |
| 2008/0103846 | A1* | 5/2008 | Armstrong et al. ............... 705/7 |
| 2008/0313018 | A1* | 12/2008 | Kamm et al. ................... 705/10 |

FOREIGN PATENT DOCUMENTS

WO    WO 99/14688    *  3/1999

OTHER PUBLICATIONS

EIC Search Aug. 9, 2011.*
Hlaves, Dale W."Lead Management and Customer Analysis." Insights Technology, Smart Business Network, Inc., 2006.*
Lager, Marshall."Shoppers and Buyers:Divide and Conquer Both." destinationCRM.com, Posted Sep. 1, 2006.*
Sauberlich, Frank, Smith, Kevin and Yuhn, Mark."Analytical Lead Management in the Automotive Industry." 2005, www.springerlink.com/index/m21w4w77p2141520.pdf.*
Dealix Corporation "Dealix Dealer Network Doubles in 2002." PR Newswire, Jan. 20, 2003.*
Vavricka, Joe and Trailer, Barry. Implementing a Formal Selling Process and Performance Measures in a Sales Organization, Trailer Vavricka, Inc., 1997.* Lasley, Ross."Segment That List Like a Professional Geek to Improve Your Sales Efficiency." Journal of Fiancial Service Professionals, Bryn Mawr: Sep. 2005, vol. 59, Iss. 5.*
Bowen, Jack and Sauberlich, Frank , "Assessing Dealer Performance in Closing Leads by Measuring Close Rate Effectiveness", Urban Science Lead Quality Conference, Jun. 12, 2007.

* cited by examiner

Primary Examiner — Beth V Boswell
Assistant Examiner — Renae Feacher
(74) Attorney, Agent, or Firm — Pepper Hamilton LLP

(57) ABSTRACT

A method of measuring the sales performance of a dealer may include determining a propensity to buy score associated with each lead received by a dealer and determining an expected close rate associated with the dealer that may be based on the determined propensity to buy scores. The method may also include determining, by a computing device, an effectiveness rate associated with the dealer that may be based on at least the expected close rate and an actual close rate.

12 Claims, 4 Drawing Sheets

| | Lead $l_i^d$ sent to dealer $d$ | Propensity to buy score $ptb(l_i^d)$ | Number of receiving dealers $RD(l_i^d)$ | Sold by dealer $d$ | Sold by other dealer | Expected Close Rate $ECR_{dealer}(d)$ | Actual close rate $(d)$ | Close Rate Effectiveness $ER_{dealer}(d)$ |
|---|---|---|---|---|---|---|---|---|
| 225 ↗ Dealer $d=1$ 220 | $l_1^1$ | 0.9 | 3 | Yes | No | $\frac{0.9}{3}+\frac{0.5}{2}+\frac{0.8}{1}+\frac{0.6}{1}+\frac{0.2}{2}=$ $\frac{5}{}$ $\frac{2.05}{5}=0.41$ | $\frac{2}{5}=0.4$ | $\frac{0.4}{0.41}=0.9756$ |
| | $l_2^1$ | 0.5 | 2 | No | Yes (dealer 3) | | | |
| | $l_3^1$ | 0.8 | 1 | Yes | No | | | |
| | $l_4^1$ | 0.6 | 1 | No | No | | | |
| | $l_5^1$ | 0.2 | 2 | No | No | | | |
| Dealer $d=2$ | $l_1^2$ | 0.4 | 1 | Yes | No | $\frac{0.4}{1}+\frac{0.9}{3}+\frac{0.2}{2}+\frac{0.1}{1}=$ $\frac{4}{}$ $\frac{0.9}{4}=0.225$ | $\frac{1}{4}=0.25$ | $\frac{0.25}{0.225}=1.1111$ |
| | $l_2^2=l_1^1$ | 0.9 | 3 | No | Yes (dealer 1) | | | |
| | $l_3^2=l_5^1$ | 0.2 | 2 | No | No | | | |
| | $l_4^2$ | 0.1 | 1 | No | No | | | |
| Dealer $d=3$ | $l_1^3$ | 0.4 | 1 | Yes | No | $\frac{0.4}{1}+\frac{0.3}{1}+\frac{0.9}{3}+\frac{0.5}{2}+\frac{0.3}{1}+\frac{0.2}{1}=$ $\frac{1.75}{6}=0.2917$ | $\frac{2}{6}=0.3333$ | $\frac{0.3333}{0.2917}=1.1427$ |
| | $l_2^3$ | 0.3 | 1 | No | No | | | |
| | $l_3^3=l_2^2=l_1^1$ | 0.9 | 3 | No | Yes (dealer 1) | | | |
| | $l_4^3=l_2^1$ | 0.5 | 2 | Yes | No | | | |
| | $l_5^3$ | 0.3 | 1 | No | No | | | |
| | $l_6^3$ | 0.2 | 1 | No | No | | | |

FIGURE 2

METHODS AND SYSTEMS FOR DETERMINING THE EFFECTIVENESS OF A DEALER'S ABILITY TO CLOSE A SALE

CROSS REFERENCE TO RELATED APPLICATIONS

This application claims priority under 35 U.S.C. §119(e) to U.S. Provisional Application No. 60/943,189, filed Jun. 11, 2007, the entirety of which is incorporated by reference herein.

Not Applicable

BACKGROUND

Shoppers are becoming more willing to share personal information in exchange for relevant and timely information regarding the products they desire. Accordingly, marketers are shifting their resource allocation from traditional cost-per-thousand ("CPM") and awareness-based advertising activities to a cost-per-acquisition or lead model. Marketers are also implementing robust measurement and tracking systems that can use the now-available data streams directed toward maximizing return on investment.

Manufacturers and other retail-based marketers currently utilize programs and operational processes to acquire retail prospects, or leads, and connect these leads directly with retailers, dealers or the like.

A retailer's success is usually measured by determining its categorical close rates that were achieved from a specific set of active leads. Close rates are typically calculated according to a client-driven set of criteria such as by lead source, by brand, by time period, by geographic unit, by retailer or the like. Assessing performance levels using close rates alone can be misleading, however, because close rates do not account for differing expectations based upon the quality of the leads in consideration. For example, if there are major quality differences in a set of leads, then an increase or decrease in close rate does not necessarily reflect follow-up or handling quality by the dealers. Rather, the close rate may be a result of the variable quality of the leads.

As such, a manufacturer or marketer can have a difficult time establishing which close rate should be expected and used as a benchmark for evaluating dealer performance. Assessing the ability of a retailer to extract maximum value from their leads is an important step in maximizing the efficiency of the overall lead management system. Implementing a process to accurately predict and track performance may ensure that appropriate resources are allocated and that the maximum value is extracted from any enterprise lead solution.

SUMMARY

Before the present methods are described, it is to be understood that this invention is not limited to the particular systems, methodologies or protocols described, as these may vary. It is also to be understood that the terminology used herein is for the purpose of describing particular embodiments only, and is not intended to limit the scope of the present disclosure which will be limited only by the appended claims.

It must be noted that as used herein and in the appended claims, the singular forms "a," "an," and "the" include plural reference unless the context clearly dictates otherwise. Unless defined otherwise, all technical and scientific terms used herein have the same meanings as commonly understood by one of ordinary skill in the art. As used herein, the term "comprising" means "including, but not limited to."

In an embodiment, a method of measuring the sales performance of a dealer may include determining a propensity to buy score associated with each lead received by a dealer and determining an expected close rate associated with the dealer that may be based on the determined propensity to buy scores. The method may also include determining, by a computing device, an effectiveness rate associated with the dealer that may be based on at least the expected close rate and an actual close rate.

In an embodiment, a method of measuring the sales performance of a dealer may include determining an expected dealer close rate for one or more dealers in a defined region, determining a regional expected close rate based on the determined expected dealer close rates and determining, by a computing device, a regional effectiveness rate associated with a dealer. The regional effectiveness rate may be based on at least the regional expected close rate and an actual close rate for the dealer.

In an embodiment, a system for measuring the sales performance of a dealer may include a processor and a processor readable storage medium in communication with the processor. The processor readable storage medium may contain one or more programming instructions for determining a propensity to buy score associated with each lead received by a dealer and determining an expected close rate associated with the dealer. The expected close rate may be based on the determined propensity to buy scores. The processor readable storage medium may also contain one or more programming instructions for determining an effectiveness rate associated with the dealer. The effectiveness rate may be based on at least the expected close rate and an actual close rate.

In an embodiment, a system for measuring the sales performance of a dealer may include a processor and a processor readable storage medium in communication with the processor. The processor readable storage medium may contain one or more programming instructions for determining an expected dealer close rate for one or more dealers in a defined region, determining a regional expected close rate based on the determined expected dealer close rates, and determining, by a computing device a regional effectiveness rate associated with a dealer. The regional effectiveness rate may be based on at least the regional expected close rate and an actual close rate for the dealer.

BRIEF DESCRIPTION OF THE DRAWINGS

FIG. 2 illustrates an exemplary data set that may be used to determine estimated closing rates on a national and dealer level according to an embodiment.

DETAILED DESCRIPTION

Figure 1:
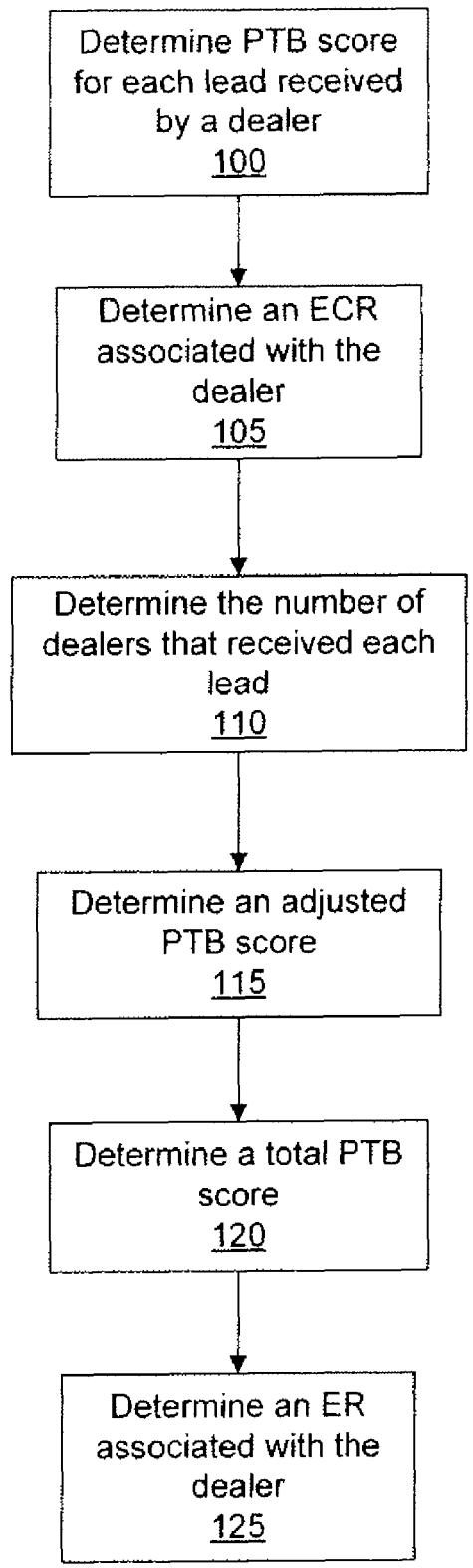
FIG. 1 depicts an exemplary flow chart for determining a dealer's effectiveness rate according to an embodiment.

Marketers, such as automotive manufacturers, real estate agents, financial analysts and/or other retail-based marketers, may utilize programs and operational processes to acquire and connect leads directly with retailers, dealers and/or the like. A lead is a potential customer, a retail prospect or the like. Close rates may be used to evaluate a retailer's performance. Close rates may be established by determining a rate of sales that were achieved from a specific set of active leads over a specified period of time and in accordance with any other criteria. A rate of sales achieved from active leads may be determined monthly, quarterly, yearly or the like. In an embodiment, criteria may include analyzing leads at a household level rather than an individual level, analyzing product specifications or the like. In an embodiment, one or more criteria may be specified by a user.

Calculating close rates alone may not provide a true assessment of retailer performance, however, because close rates may not account for variations in the quality of the leads. In an embodiment, actual lead close rates may display significant variance. For example, close rate performance for leads from different sources, leads for different products requested, and leads originating from different lead-generating environments, such as Internet leads, mail leads and the like, may exhibit significant variation. In some cases, this variation may be expected, such as when the increase in quality may be the result of a proactive marketing campaign by the retailer. In other cases, however, the variation may not be anticipated, such as if the variation is the result of actions outside of the retailer's control. Examples may include a change in search engine marketing strategies by a lead provider, a change in marketing strategy by a competitor or the like.

In an embodiment, a propensity-to-buy ("PTB") score may be used to determine expected sales from a group of leads. A PTB score may measure the likelihood that a lead will buy a certain product or service from a certain dealer.

In an embodiment, depending on how the PTB score is derived, it may be necessary to adjust the performance expectation to address possible inconsistencies. For example, if a lead capture system a distribution system or the like allows for a lead to be sent to multiple dealers, then an adjustment to the performance expectation may be made.

In an embodiment, a PTB score may be based on a corporate close rate analysis rather than on a dealer-specific rate. In such an embodiment, a local or national standard may be applied based on the proportion of leads typically closed at a receiving dealer. For example it may be reasonable to implement a national standard of performance in urban areas given the level of like-branded dealer proximity and competition inherent in a market. In contrast, it may be appropriate to assign a higher-than-national standard in rural areas because these areas have less proximity of like-brand dealerships and a higher-than-national standard may be more reflective of the geographic brand exclusivity for the dealer.

In an embodiment, a PTB score may be used to assess a retailer's expected close rate ("ECR"). An ECR may be an estimation of how many leads a dealer is expected to close over a certain time period. For example, an ECR may represent an average expected performance of a dealer for a specific set of leads. In an embodiment, an ECR's predictive ability may originate from a compilation of native and third-party customer level information available for each specific lead.

In an embodiment, a PTB score may be used to determine an ECR value. For example, a PTB score for each lead received may be summed, and this sum may be divided by the total number of leads received to determine an ECR value. In an embodiment, an expected close rate may be determined by dividing the sum of all expected close rate probabilities by the number of leads over a specified period of time. An ECR may be used to predict the expected rates of sale from any given entity, such as a dealer, a retailer, a source, a geographic unit or the like. ECRs may be determined on various levels such as on a national level, on a dealer level, by lead source, by make, by model or the like.

In an embodiment, the ECR may be indexed against a dealer's actual close rate to calculate the dealer's effectiveness rate ("ER"). An effectiveness rate may measure the dealer's ability to close one or more leads. In an embodiment, lead quality may be factored into an assessment of retailer performance by determining an effectiveness rate of a retailer's ability to close. An ER may be based on a detailed predictive modeling of the propensity of a lead to close that may consider criteria established by a client. For example, a scoring model may assign a close rate probability to each individual lead. A close rate probability may represent a prediction of the lead's propensity to buy or the like. As such, the close rate probability associated with a lead may be referred to as a PTB score.

FIG. 1 illustrates a flow chart of an exemplary method of determining an ER for a dealer at a dealer level according to an embodiment.

A PTB score may be determined 100 for each lead received by a dealer. Methods for determining PTB scores are known in the art, and any such method may be used within the scope of this disclosure. The PTB scores may be used to determine 105 an ECR associated with the dealer. In an embodiment, an ECR on a dealer level may be represented by:

$$ECR_{dealer}(d) = \frac{\sum_{i=1}^{N(d)} \frac{ptb(l_i^d)}{RD(l_i^d)}}{N(d)} \text{ where}$$

$l_i^d$=lead i=1, ..., N(d) sent to dealer d=1, ..., D, where i is a national lead for the time period under consideration;

N(d)=number of leads which were sent and/or followed up on by dealer d;

ptb($l_i^d$)=propensity to buy score for lead $l_i^d$; where 0≤ptb($l_i^d$)≤1;

RD($l_i^d$)=number of dealers that received lead $l_i^d$.

For example, for each lead received by the dealer, a total number of dealers that received that lead may be determined 110, and an adjusted PTB score may be determined 115. In an embodiment, an adjusted PTB score may be determined by dividing the determined PTB score associated with the lead by the total number of dealers who received the lead. A total PTB score may be determined 120 by summing the adjusted propensity to buy scores. In an embodiment, an ECR associated with the dealer may be determined 105 by determining the ratio of the total PTB score to the total number of leads received by the dealer.

In an embodiment, an ER associated with the dealer may be determined 125. The ER may be determined 125 by dividing an actual close rate associated with the dealer by the determined ECR associated with the dealer. In an embodiment, an actual close rate associated with a dealer may be determined by dividing the number of leads the were closed by the dealer by the number of leads received by the dealer. An ER associated with a dealer may be represented by:

$$ER_{dealer}(d) = \frac{\text{actual\_close\_rate\_for\_dealer\_d}}{ECR_{dealer}(d)}$$

FIG. 2 illustrates an exemplary data set that may be used to determine ECR and ER values on a dealer level. For example, as illustrated by FIG. 2, the ECR 210 and ER 230 for Dealer 1 220 may be determined as follows. A PTB score 200 may be determined for the five leads 205 received by Dealer 1 220. An adjusted PTB score may be determined by dividing the PTB score 200 associated with each lead by the total number of dealers who received the lead 215. For example, lead 1 225 is associated with a PTB score of 0.9 and was received by three dealers. As such, the adjusted PTB score associated with lead 1 225 is 0.3

$$\left(\text{i.e. } \frac{0.9}{3}\right).$$

A total PTB score may be determined for Dealer 1 220 by summing the adjusted PTB scores associated with the five leads 205

$$\left(\text{i.e., } \frac{0.9}{3} + \frac{0.5}{2} + \frac{0.8}{1} + \frac{0.6}{1} + \frac{0.2}{2}\right).$$

In an embodiment, the ECR 210 for Dealer 1 220 (i.e., 0.41) may be determined by dividing the total PTB score associated with Dealer 1 220 (i.e., 2.05) by the total number of leads received by Dealer 1 220 (i.e., 5).

In an embodiment, an actual close rate 235 (i.e., 0.4) may be determined for Dealer 1 220 by dividing the number of leads closed by Dealer 1 220 (i.e., 2) by the number of leads received by Dealer 1 220 (i.e., 5). The ER 230 (i.e., 0.9756) associated with Dealer 1 220 may be determined by dividing the actual close rate 235 associated with Dealer 1 220 (i.e., 0.4) by the ECR 210 associated with Dealer 1 220 (i.e., 0.41).

Table 1 illustrates exemplary ECR values, actual CR values and ER values associated with the exemplary data depicted in FIG. 2.

TABLE 1

| Dealer # | ECR | Actual CR | ER |
|---|---|---|---|
| 1 | 41.0% | 40.0% | 97.6% |
| 2 | 22.5% | 25.0% | 111.0% |
| 3 | 29.2% | 33.3% | 114.4% |

As illustrated by Table 1, Dealer 1 has the highest actual close rate, but Dealer 2 and Dealer 3, although they have lower actual close rates, have higher ER values than Dealer 1.

FIG. 2 also illustrates a potential effect of adjusting the ECR values based on multiple receiving dealers. For example if the ECR value for Dealer 1 220 was not adjusted, the ECR value may be:

$$\frac{0.9 + 0.5 + 0.8 + 0.6 + 0.2}{5} = \frac{3}{5} = 0.6.$$

Similarly the ECR values for Dealer 2 and Dealer 3 may be 0.4 and 0.4333, respectively. When compared to the actual close rates, the non-adjusted ECR values may be too high because some leads that are handled by multiple dealers are not taken into account.

Figure 3:
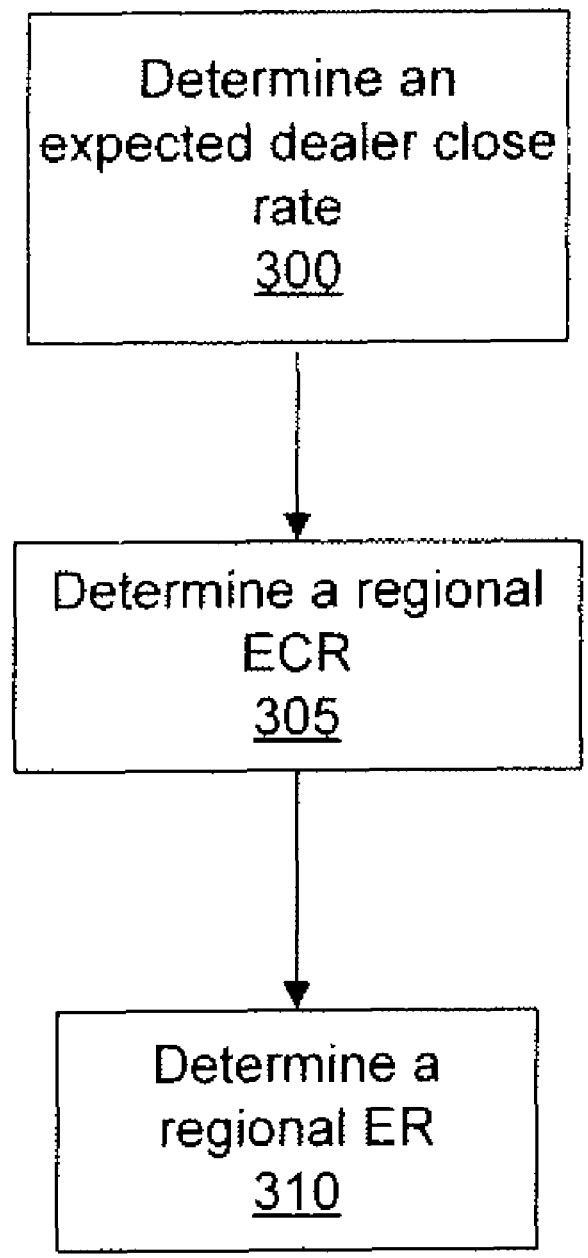
FIG. 3 illustrates a flow chart of an exemplary method of determining an effectiveness rate for a dealer at a regional level according to an embodiment.

FIG. 3 illustrates a flow chart of an exemplary method of determining an effectiveness rate for a dealer at a regional level according to an embodiment. In an embodiment, an ECR on a regional level may be represented by:

$$ECR_{regional} = \frac{\sum_{d=1}^{D} N(d) * ECR_{dealer}(d)}{\sum_{d=1}^{D} N(d)}$$

An expected dealer close rate may be determined 300 for one or more dealers in a defined region. In an embodiment, an expected dealer close rate may be determined 300 similarly to determining an ECR on a dealer level as described above.

A regional expected close rate may be determined 305. In an embodiment, the regional expected close rate may be based on at least the determined expected dealer close rates. The regional expected close rate may be determined 305 by determining a total number of leads received by each dealer in the defined region and determining an adjusted expected close rate for the dealer. In an embodiment, a defined region may be one or more counties, cities, metropolitan areas, states, nations, other geographic regions and/or the like.

In an embodiment, the adjusted expected close rate may be determined by multiplying the total number of leads received by the dealer by the expected dealer close rate associated with the dealer. A cumulative number of leads may be determined by summing the total number of leads received by each dealer. The regional expected close rate may be determined 305 by dividing the adjusted expected close rate by the cumulative number of leads.

In an embodiment, a regional effectiveness rate associated with a dealer may be determined 310. A regional ER associated with a dealer may be represented by:

$$ER_{regional}(d) = \frac{\text{actual\_close\_rate\_for\_dealer\_d}}{ECR_{regional}}$$

The regional ER may be determined 310 by dividing the actual close rate for the dealer by the regional ECR.

In an embodiment, if the three dealers illustrated in Table 1 represent a sales region for a common manufacturer, then ECR values, actual close rates and ER values may be determined on a regional level. For example, using the exemplary data from FIG. 2, exemplary regional values may be determined as follows:

$$ECR_{regional} = \frac{\sum_{d=1}^{3} N(d) * ECR_{dealer}(d)}{\sum_{d=1}^{3} N(d)} = \frac{2.05 + 0.9 + 1.75}{5 + 4 + 6} = \frac{4.8}{15} = 0.32$$

$$ER_{regional} = \frac{\text{actual\_close\_rate\_for\_dealer\_d}}{ECR_{regional}} = \frac{0.3333}{0.32} = 1.04167$$

These values indicate that the ECR values on a higher geographical level may equal the sum of the expected sales of all corresponding dealers divide by the number of leads sent out. In an embodiment, if a lead were not sent to multiple dealers, the expected number of sales calculated out of the sum of the scores may have been 4.8. However, in the above example, the number of leads sent would only have been 11, which may result in an expected regional close rate of $$\frac{4.8}{11} = 0.43636.$$

In an embodiment, a report may be generated by a manufacturer, a marketer, a dealer, a retailer or the like. A report may include the leads sent to a dealer, the PTB scores associated with the leads, the number of receiving dealers, an indication of which dealer closed the deal, ECR values corresponding to one or more dealers, actual close rate values corresponding to one or more dealers, ER values corresponding to one or more dealers and/or the like.

In an embodiment, once generated, the report may be distributed to one or more users. The report may be distributed to users by printing, emailing, faxing, scanning or the like. In an embodiment, the report may be distributed to a remote user by a communications network or the like.

Figure 4:
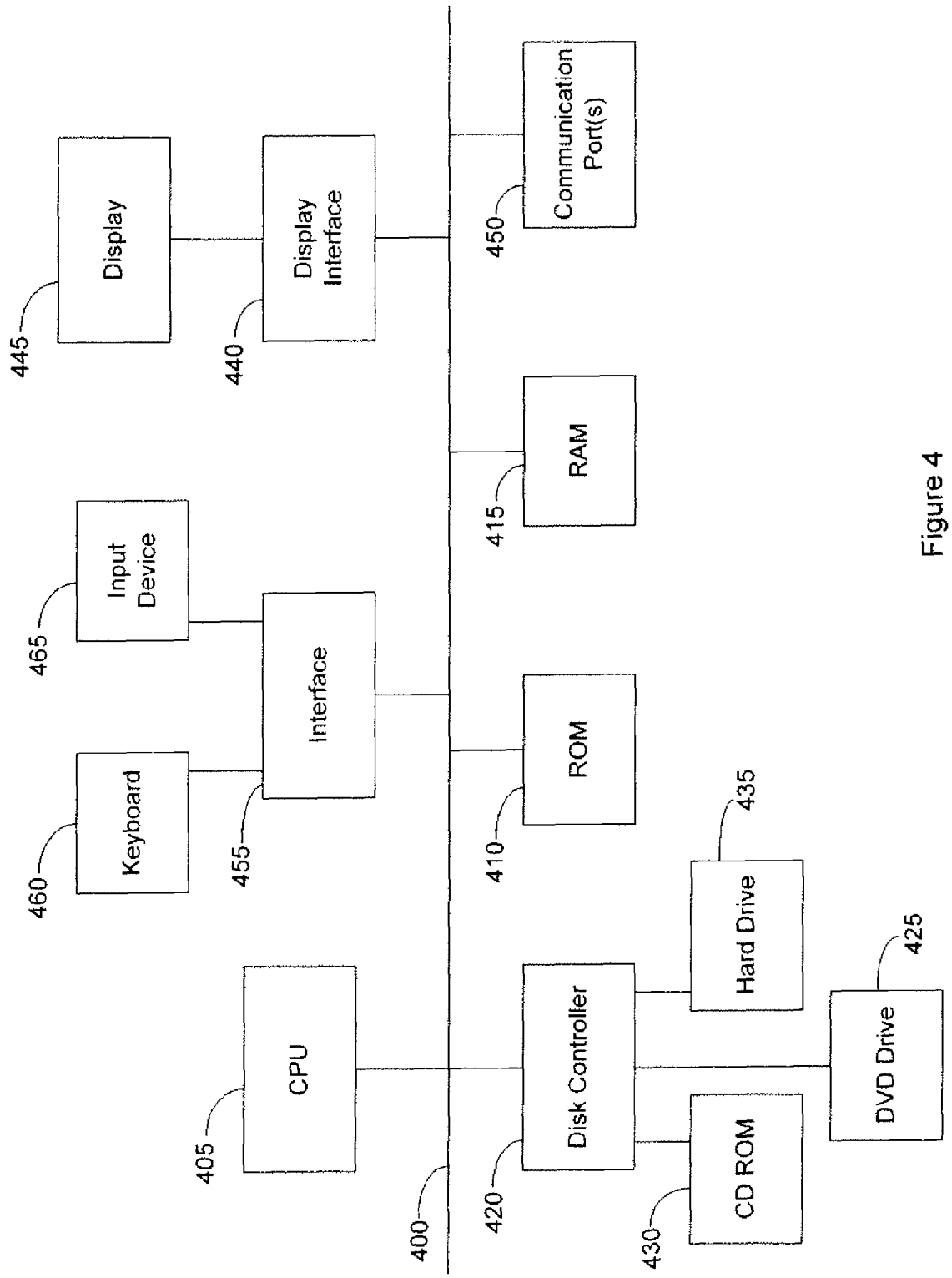
FIG. 4 depicts a block diagram of exemplary internal hardware that may be used to contain or implement program instructions according to an embodiment.

FIG. 4 depicts a block diagram of exemplary internal hardware that may be used to contain or implement program instructions according to an embodiment. Referring to FIG. 4, a bus 400 serves as the main information highway interconnecting the other illustrated components of the hardware. CPU 405 is the central processing unit of the system, performing calculations and logic operations required to execute a program. Read only memory (ROM) 410 and random access memory (RAM) 415 constitute exemplary memory devices.

A disk controller 420 interfaces with one or more optional disk drives to the system bus 400. These disk drives may include, for example, external or internal DVD drives 425, CD ROM drives 430 or hard drives 435. As indicated previously, these various disk drives and disk controllers are optional devices.

Program instructions may be stored in the ROM 410 and/or the RAM 415. Optionally, program instructions may be stored on a tangible computer readable medium such as a compact disk, a digital disk or other recording medium.

An optional display interface 440 may permit information from the bus 400 to be displayed on the display 445 in audio, graphic or alphanumeric format. Communication with external devices may occur using various communication ports 450. An exemplary communication port 450 may be attached to a communications network, such as the Internet or an intranet.

In addition to the standard computer-type components, the hardware may also which allows for receipt of data from input devices such as a keyboard 460 or other input device 465 such as a mouse, remote control, pointer and/or joystick.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method of measuring sales performance of a dealer, the method comprising:
    determining a propensity to buy score associated with each of one or more leads received by the dealer;
    calculating an expected close rate associated with the dealer, wherein calculating the expected close rate comprises:
        for each lead received by the dealer:
            determining a total number of dealers that received the lead, and
            determining an adjusted propensity to buy score by dividing the
            determined propensity to buy score associated with the lead by a total
        number of dealers that received the lead,
            determining a total propensity to buy score by summing the adjusted propensity to buy score for each lead received by the dealer, and
            determining a ratio of the total propensity to buy score to a total number of leads received by the dealer; and
    determining, by a computing device, an effectiveness rate associated with the dealer, wherein determining the effectiveness rate comprises:
        determining the actual close rate associated with the dealer, and
        determining a ratio of the actual close rate associated with the dealer to the expected close rate associated with the dealer.

2. The method of claim 1, further comprising generating a report comprising one or more of the following:
    one or more leads;
    the propensity to buy score associated with one or more leads;
    the total number of dealers that received each lead;
    a total number of leads;
    the expected close rate associated with the dealer; and
    the effectiveness rate associated with the dealer.

3. The method of claim 2, further comprising:
    distributing the report to one or more users over a communication network, wherein distributing comprises one or more of printing, faxing, emailing and scanning the report to the one or more users.

4. A method of measuring sales performance of a dealer, the method comprising:
    calculating an expected dealer close rate for each of a plurality of dealers in a defined region, wherein calculating the expected dealer close rate comprises:
        determining a propensity to buy score associated with each lead received by at least one of the plurality of dealers,
        for each lead received by the at least one of the plurality of dealers:
            determining a total number of dealers that received the lead, and
            determining an adjusted propensity to buy score by dividing the determined propensity to buy score associated with the lead by the total number of dealers,
        determining a total propensity to buy score by summing the adjusted propensity to buy score for each lead received by the at least one dealer, and
        determining a ratio of the total propensity to buy score to a total number of leads received by the dealer;
    determining a regional expected close rate comprising:
        for each dealer:
            determining a total number of leads received by the dealer, and
            determining an adjusted expected close rate for the dealer by multiplying the total number of leads received by the dealer by the expected dealer close rate associated with the dealer;

determining a total adjusted expected close rate by summing the adjusted expected close rates associated with each dealer;

determining a cumulative number of leads by summing the total number of leads received by each dealer; and dividing the total adjusted expected close rate by the cumulative number of leads; and determining, by a computing device, a regional effectiveness rate associated with at least one of the dealers, wherein the regional effectiveness rate for the at least one dealer is based on at least the regional expected close rate and an actual close rate for the at least one dealer.

5. The method of claim 4, wherein determining a regional effectiveness rate associated with each dealer comprises:

determining an actual regional close rate; and determining a ratio of the actual close rate for the dealer to the regional expected close rate.

6. The method of claim 4, wherein the defined region comprises one or more of the following:

a county;
a city;
a state;
a metropolitan area,
a geographic region; and
a nation.

7. The method of claim 4 further comprising generating a report comprising one or more of the following:

one or more leads;
the propensity to buy score associated with one or more lead;
the total number of dealers that received each lead;
a total number of leads;
the expected dealer close rate associated with at least one of the dealers;
the regional expected close rate associated with at least one of the dealers;
the actual close rate for at least one of the dealers; and
the regional effectiveness rate associated with at least one of the dealers.

8. The method of claim 7, further comprising:

distributing the report to one or more users over a communication network, wherein distributing comprises one or more of printing, faxing, emailing and scanning the report to the one or more users.

9. A system for measuring sales performance of a dealer comprising:

a processor; and a processor readable storage medium in communication with the processor, wherein the processor readable storage medium contains one or more programming instructions for:

determining a propensity to buy score associated with each of one or more leads received by the dealer, calculating an expected close rate associated with the dealer, wherein calculating the expected close rate comprises:

for each lead received by the dealer:

determining a total number of dealers that received the lead, and determining an adjusted propensity to buy score by dividing the determined propensity to buy score associated with the lead by a total number of dealers that received the lead, determining a total propensity to buy score by summing the adjusted propensity to buy score for each lead received by the dealer, and determining a ratio of the total propensity to buy score to a total number of leads received by the dealer, and determining an effectiveness rate associated with the dealer, wherein determining the effectiveness rate comprises:

determining the actual close rate associated with the dealer, and determining a ratio of the actual close rate associated with the dealer to the expected close rate associated with the dealer.

10. A system for measuring sales performance of a dealer comprising:

a processor; and a processor readable storage medium in communication with the processor, wherein the processor readable storage medium contains one or more programming instructions for:

determining an expected dealer close rate for each of a plurality of dealers in a defined region, wherein determining an expected dealer close rate comprises:

determining a propensity to buy score associated with each lead received by the dealer, for each lead received by the dealer:

determining a total number of dealers that received the lead, and determining an adjusted propensity to buy score by dividing the determined propensity to buy score associated with the lead by the total number of dealers, determining a total propensity to buy score by summing the adjusted propensity to buy score for each lead received by the dealer, and determining a ratio of the total propensity to buy score to a total number of leads received by the dealer, determining a regional expected close rate comprising:

for each dealer:

determining a total number of leads received by the dealer, and determining an adjusted expected close rate for the dealer by multiplying the total number of leads received by the dealer by the expected dealer close rate associated with the dealer, determining a total adjusted expected close rate by summing the adjusted expected close rates associated with each dealer, determining a cumulative number of leads by summing the total number of leads received by each dealer, and dividing the total adjusted expected close rate by the cumulative number of leads, and determining, by a computing device, a regional effectiveness rate associated with at least one of the dealers, wherein the regional effectiveness rate is based on at least the regional expected close rate and an actual close rate for the at least one dealer.

11. The system of claim 10, wherein the one or more programming instructions for determining a regional effectiveness rate associated with the at least one dealer comprises one or more programming instructions for:

determining an actual regional close rate; and determining a ratio of the actual close rate for the dealer to the regional expected close rate.

12. The system of claim 10, further comprising one or more programming instructions for:
  generating a report comprising one or more of the following:
    one or more leads,
    the propensity to buy score associated with one or more lead,
    the total number of dealers that received each lead,
    a total number of leads,
    the expected dealer close rate associated with at least one of the dealers,
    the regional expected close rate associated with at least one of the dealers,
    the actual close rate for at least one of the dealers, and
    the regional effectiveness rate associated with at least one of the dealers; and
  distributing the report to one or more users over a communication network, wherein distributing comprises one or more of printing, faxing, emailing and scanning the report to the one or more users.

* * * * *